US 6,556,745 B1

(12) United States Patent
Horne

(10) Patent No.: US 6,556,745 B1
(45) Date of Patent: Apr. 29, 2003

(54) WAVELENGTH SELECTIVE REFLECTIVE/ TRANSMISSIVE OPTICAL COUPLER AND METHOD

(75) Inventor: David M. Horne, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/007,566

(22) Filed: Nov. 8, 2001

(51) Int. Cl.[7] ............................................. G02B 6/293
(52) U.S. Cl. ......................... 385/24; 385/15; 359/124; 359/127
(58) Field of Search ........................... 385/24, 15, 37, 385/124, 127, 130

(56) References Cited

U.S. PATENT DOCUMENTS

| | | | | |
|---|---|---|---|---|
| 5,748,350 A | * | 5/1998 | Pan et al. | 359/127 |
| 5,774,606 A | * | 6/1998 | de Barros et al. | 359/127 |
| 5,778,119 A | * | 7/1998 | Farries | 385/24 |
| 5,808,764 A | * | 9/1998 | Frigo et al. | 359/121 |
| 6,061,484 A | * | 5/2000 | Jones et al. | 359/127 |
| 6,067,389 A | * | 5/2000 | Fatehi et al. | 385/17 |
| 2001/0012424 A1 | * | 8/2001 | Kato et al. | 385/24 |
| 2002/0075537 A1 | * | 6/2002 | Amin et al. | 359/124 |

OTHER PUBLICATIONS

Grubsky, V., et al., "Wavelength–selective coupler and add- –drop multiplexer using long–period fiber gratings", *FB5– Fiber Bragg Gratings, Optical Fiber Communication Conference (OFC2000)*, 28–30, (Mar. 2000).

* cited by examiner

*Primary Examiner*—John D. Lee
*Assistant Examiner*—Dan Valencia
(74) *Attorney, Agent, or Firm*—Schwegman, Lundberg, Woessner & Kluth, P.A.

(57) ABSTRACT

An optical coupler operates as a reflective splitter for predetermined wavelengths and operates as an optical transmissive combiner and an optical transmissive splitter for other wavelengths. Wavelength-selective reflective elements reflect the predetermined wavelength from an output of a transmissive coupling element and pass other wavelengths to another the transmissive coupling element. The optical coupler also includes wavelength-selective coupling elements to transfer the predetermined wavelength between outputs of transmissive coupling elements and inhibit transmission of other wavelengths therebetween. The wavelength-selective coupling elements can be long-period gratings with a resonance wavelength at the predetermined wavelength. The wavelength-selective reflective elements can be Bragg gratings with a grating spacing of one-half the predetermined wavelength.

25 Claims, 4 Drawing Sheets

WAVELENGTH SELECTIVE REFLECTIVE/ TRANSMISSIVE OPTICAL COUPLER AND METHOD

CROSS-REFERENCE TO RELATED APPLICATIONS

This application is related to co-pending U.S. patent application, Ser. No. 09/966,839, filed Sep. 28, 2001 entitled "Method and Apparatus for Transmission of Upstream Data in an Optical Network" which is assigned to the same assignee as the present application.

FIELD OF THE INVENTION

The present invention pertains to optical couplers, and more particularly to data transmission in optical networks using optical couplers.

BACKGROUND OF THE INVENTION

Passive Optical Networks (PONs) facilitate the communication of two-way high-bandwidth data between a system head-end and various end nodes. A conventional PON generally includes a fiber-optic star or tree coupling device which connects optical paths extending from the system head-end to the remotely located end nodes. Downstream optical signals are transmitted from the system head-end over an optical distribution fiber to an outside plant node where the signal is passively split and distributed to the remotely located end nodes. The end nodes may transmit optically encoded signals upstream to the outside plant node to form a multiplexed signal on the distribution fiber for transmission to the system head-end.

For downstream transmission from a system head-end to remotely located end nodes, PONs may implement time division multiplex (TDM) techniques, wavelength division multiplex (WDM) techniques, or other techniques for partitioning data destined for individual end nodes. For upstream transmissions, where many end nodes may access the fiber media, the multiple access may be achieved by time division multiple access (TDMA), wavelength division multiple access (WDMA), code division multiple access (CDMA), or combinations thereof.

One of the most basic schemes utilizes TDM for downstream data transmissions and TDMA for upstream data transmissions and is often referred to as a power-splitting TDMA PON. Downstream data is a "broadcast and select" TDM stream of data frames. Each end node receives a broadcast copy of the downstream TDM data and selects its own specific data based on an address within the TDM stream. This TDM stream may occupy a single wavelength. For upstream data transmissions, end nodes achieve multiple access by synchronizing their upstream transmissions so that they occur in a pre-assigned interval. This synchronization helps eliminate overlap of upstream data transmissions from the splitter/combiner device after multiple data streams from end nodes are combined. The upstream data may be transmitted on a single wavelength which generally is a distinct wavelength from the downstream.

The process of arbitrating and synchronizing upstream data transmissions has conventionally treated the head-end as a master device and the end nodes as the slave devices. The slave devices request permission to transmit from the master; the master then schedules the time slots in the future and informs the slaves of the granted future time slots. For networks, such as a cable data network, where transmission speeds are 100 to 1000 times lower than an optical network, the negotiation time and propagation delay between the slaves and the master during this request/grant protocol between master and slave consumes an insignificant amount of upstream bandwidth and does not significantly impact upstream data transmissions. An insignificant number of data-bit periods elapse relative to the propagation delay and negotiation time. In an optical network, such as a gigabit fiber network, the request/grant negotiation and its propagation time consume a more significant amount of upstream data bandwidth because of the shorter bit times. This negotiation and propagation time could otherwise be used for upstream data transmissions.

Thus there is a need for improving upstream data transmission efficiency in an optical network. There is also a need for reducing request/grant negotiation and propagation time in an optical network. There is also a need for distinguishing between upstream data and upstream control signals for improved upstream data transmission efficiency in an optical network.

BRIEF DESCRIPTION OF THE DRAWINGS

The invention is pointed out with particularity in the appended claims. However, a more complete understanding of the present invention may be derived by referring to the detailed description in connection with the figures, wherein like reference numbers refer to similar items throughout the figures and:

DETAILED DESCRIPTION

Figure 1:
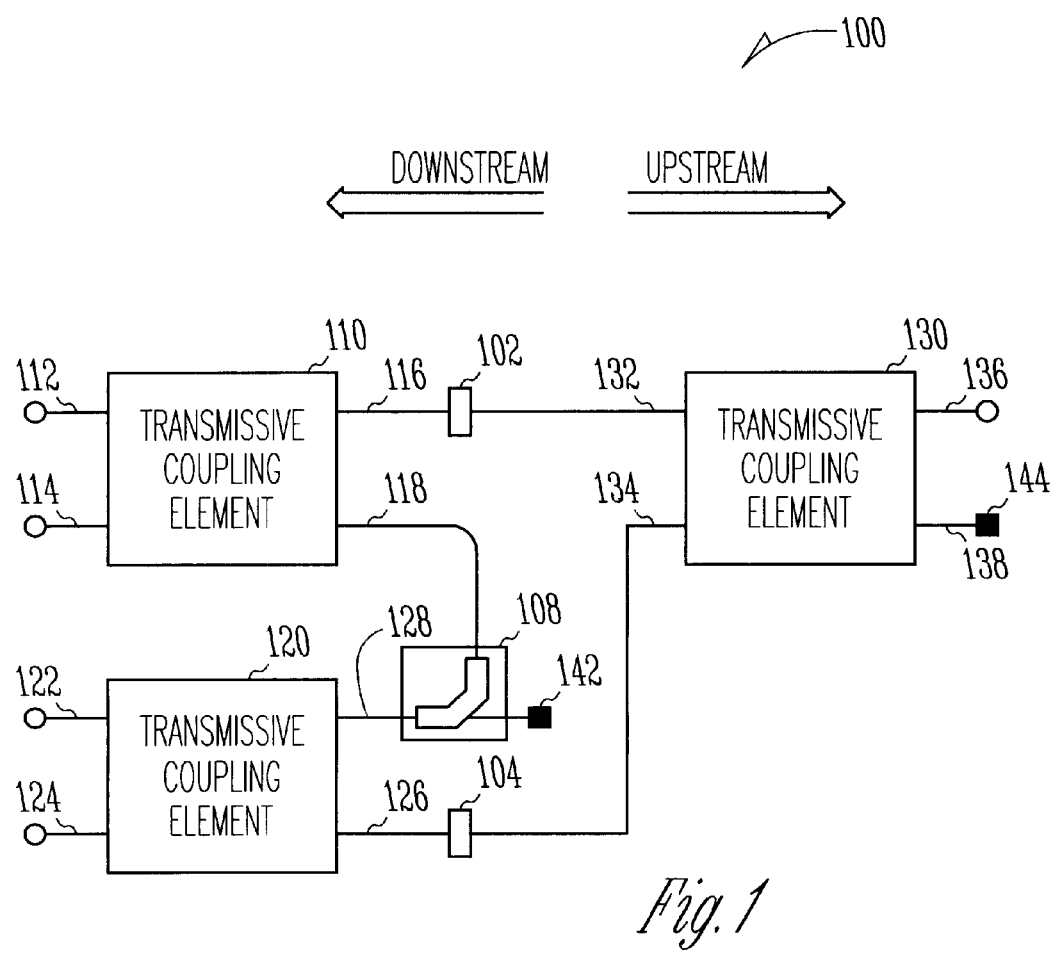
FIG. 1 is a functional block diagram of an optical coupler in accordance with an embodiment of the present invention.

The description set out herein illustrates the various embodiments of the invention and such description is not intended to be construed as limiting in any manner. The present invention relates to optical couplers. In one aspect, an optical coupler of the present invention improves upstream data transmission efficiency in an optical network. In another aspect, an optical coupler reduces or eliminates request/grant negotiation and propagation time for scheduling upstream data transmissions in an optical network. In another aspect, an optical coupler distinguishes between upstream data and upstream control signals in an optical network. In another aspect, an optical coupler operates as a reflective splitter for predetermined wavelengths and operates as a transmissive combiner and a transmissive splitter for other wavelengths.

In one aspect of the present invention, an optical coupler reflects a predetermined wavelength to each port of a first set when received at one of the ports of the first set. Wavelengths other than the predetermined wavelength transfer to each port of a second set when received at a port of the first set. Wavelengths other than the second are also transferred to each port of the first set when received at a port of the second set. The optical coupler includes a wavelength-selective reflective element associated with a transmissive star coupler to reflect the predetermined wavelength from an output of the transmissive star coupler of a first set and to pass other wavelengths between the associated transmissive star coupler and a transmissive star coupler of a second set. The optical coupler also includes wavelength-selective coupling elements to transfer the predetermined wavelength between outputs of the transmissive star couplers of the first set and to inhibit transmission of other wavelengths therebetween. At least one of the wavelength-selective coupling elements may be a long-period grating with a resonance wavelength at the predetermined wavelength. At least one of the wavelength-selective selective reflective elements may be a Bragg grating with a spacing of one-half the predetermined wavelength to substantially reflect the predetermined wavelength and pass other wavelengths.

In another aspect of the present invention, a method of coupling optical signals includes transferring signals other than a predetermined wavelength received at ports of a first set to ports of a second set, transferring signals on the predetermined wavelength received at a port of the first set to other ports of the first set, and inhibiting signals on wavelengths other than the predetermined wavelength received at a port of the first set from transmission to other ports of the first set. The method also may include transferring signals on wavelengths received at ports of the second set to ports of the first set.

The optical coupler of the present invention may be suitable for use in passive optical networks (PONs) that transmit and receive upstream and downstream data between a system controller and a set of optical network units. It may also be suitable for use in PONs that utilize time division multiple access (TDMA) techniques for the upstream data transmissions. It may also be suitable for use in PONs that utilize upstream control signals on a different wavelength than upstream data transmissions.

FIG. 1 is a functional block diagram of an optical coupler in accordance with an embodiment of the present invention. Optical coupler 100 operates as an optical transmissive combiner and an optical transmissive splitter for certain wavelengths, while a predetermined wavelength or wavelengths, optical coupler 100 operates similarly to a reflective splitter. In other words, predetermined wavelengths received at particular ports appear to be reflected back to those ports, while other wavelengths transfer to other ports. As used herein, the term predetermined wavelength may include one or more predetermined or preselected wavelengths.

Optical coupler 100 includes first transmissive coupling element 110, second transmissive coupling element 120 and third transmissive coupling element 130. Transmissive coupling elements 110, 120 and 130 combine upstream signals received at inputs 112, 114, 122 and 124 and produce a combined upstream signal at output 136. Transmissive coupling elements 110, 120 and 130 may be transmissive star couplers, and as illustrated in FIG. 1, may be 2×2 transmissive star couplers. Transmissive coupling elements 110, 120 and 130 also divide downstream signals received at outputs 136 and 138 to each input 112, 114, 122 and 124. Optic fibers or waveguides transfer signals on optical wavelengths between the various elements of optical coupler 100. Transmissive coupling elements 110, 120 and 130 may comprise 2×2 evanescent couplers such as fused biconic taper devices. Optical coupler 100 may also include one or more optical terminations 144 coupled to output 138 of coupling element 130 to reduce reflections of wavelengths at any unused outputs. The terms "input" and "output" are used herein for convenience to designate the flow of upstream signals with respect to optical coupler 100. Transmissive coupling elements 110, 120 and 130, however, may operate equally in both upstream and downstream directions and therefore the terms "input" and "output" are interchangeable.

When optical coupler 100 is used in an optical network, signals received at inputs 112, 114, 122 and 124 may be viewed as upstream signals while the signal received at output 136 may be viewed as downstream signals. Upstream and downstream signals may, for example, be on different wavelengths, although nothing prohibits both the upstream and downstream signals from being on the same wavelength or on many different wavelengths.

Optical coupler 100 also includes first wavelength-selective reflective element 102 to reflect a predetermined wavelength from output 116 of transmissive coupling element 110 back through transmissive coupling element 110 to inputs 112 and 114. Element 102 passes other wavelengths between output 116 of transmissive coupling element 110 and input 132 of transmissive coupling element 130. Optical coupler 100 also includes second wavelength-selective reflective element 104 to reflect the predetermined wavelength from output 126 of transmissive coupling element 120 back through transmissive coupling element 120 to inputs 122, 124. Element 104 passes other wavelengths between output 126 of transmissive coupling element 120 and input 134 of transmissive coupling element 130.

At least one of the wavelength reflective elements 102 and 104 may include a Bragg grating which may have a grating spacing of one-half the predetermined wavelength. The Bragg grating may be a fiber or other optical waveguide to substantially reflect the predetermined wavelength while passing other wavelengths. At least one of wavelength reflective elements 102 and 104 may be an optical lens having a coating to substantially reflect at least the predetermined wavelength while passing other wavelengths.

Optical coupler 100 also includes wavelength-selective coupling element 108 to transfer the predetermined wavelength between outputs 118 and 128 of transmissive coupling elements 110 and 120 and to inhibit transmission of other wavelengths. Resonant wavelengths such as the predetermined wavelength transfer from output 128 of transmissive coupling element 120 to output 118 of transmissive coupling element 110 while other wavelengths are inhibited from transferring. The other wavelengths pass through to the direct output of element 108 to termination 142.

Wavelength-selective coupling element 108 may be a wavelength selective coupler having long-period gratings with a resonance wavelength at the predetermined wavelength. The long-period gratings may be fabricated in an optical fiber or other optical waveguide. Wavelength-selective coupling element 108 receives signals on wavelengths including the predetermined wavelength from output 128. In the case of an optical fiber, the long-period grating of element 108 converts the predetermined wavelength from a core mode in an optic fiber to a cladding mode of that fiber without substantially affecting other wavelengths. The predetermined wavelength propagates in the cladding mode through a region having close physical contact with a second optic fiber and excites a similar cladding mode in the second fiber. A second long-period grating in the second fiber transforms the predetermined wavelength from the cladding mode into a core mode of the second fiber. Accordingly, only light at the resonance wavelength (e.g., the predetermined wavelength) of the long-period gratings is coupled between the core of the first fiber and the core of the second fiber. The second fiber may be considered the coupled output of wavelength-selective coupling element 108 and connects with output 118 of coupling element 110. In one embodiment of optical coupler 100, wavelength-selective coupling element 108 may be a blaze grating which utilizes a side tap to selectively couple certain wavelengths, such as the predetermined wavelength, while passing other wavelengths.

Accordingly, resonant wavelengths such as the predetermined wavelength transfer from output 128 of transmissive coupling element 120 to output 118 of transmissive coupling element 110 while other wavelengths are inhibited from being transferred. The other wavelengths pass through to the direct output of element 108 to termination 142. Similarly, resonant wavelengths such as the predetermined wavelength transfer from output 118 of transmissive coupling element 110 to output 128 of transmissive coupling element 120, while other wavelengths are inhibited from transferring. Termination 142 may be an optical termination coupled to a direct output of wavelength-selective coupling element 108 reducing reflections of the non-resonant wavelengths back to the direct output of wavelength-selective coupling element 108.

In one embodiment of optical coupler 100, wavelength-selective coupling element 108 and termination 142 connect directly to output 118 of transmissive coupling element 110 with coupled port of wavelength-selective coupling element 108 connecting with output 128 of transmissive coupling element 120. In another embodiment of optical coupler 100, input 134 connects to the direct output of wavelength-selective coupling element 108 while termination 142 connects to wavelength-selective reflective element 104.

The various embodiments of optical coupler 100 may readily be extended to optical couplers having a greater number of inputs and may also include optical couplers having more than one output. Additional transmissive star couplers may be added, or other types of transmissive star couplers may be used. For example, 4×4 transmissive star couplers may be used with additional wavelength-selective coupling elements and additional wavelength-selective reflective elements.

Although the various embodiments of optical coupler 100 are described as operating as a reflective coupler at a particular wavelength (i.e., the predetermined wavelength), the wavelength-selective reflective elements and the wavelength selective transmissive element of optical coupler 100 may be configured to selectively reflect and selectively couple more than one particular wavelength allowing optical coupler 100 to operate as a reflective coupler at more than one predetermined wavelength.

Figure 2:
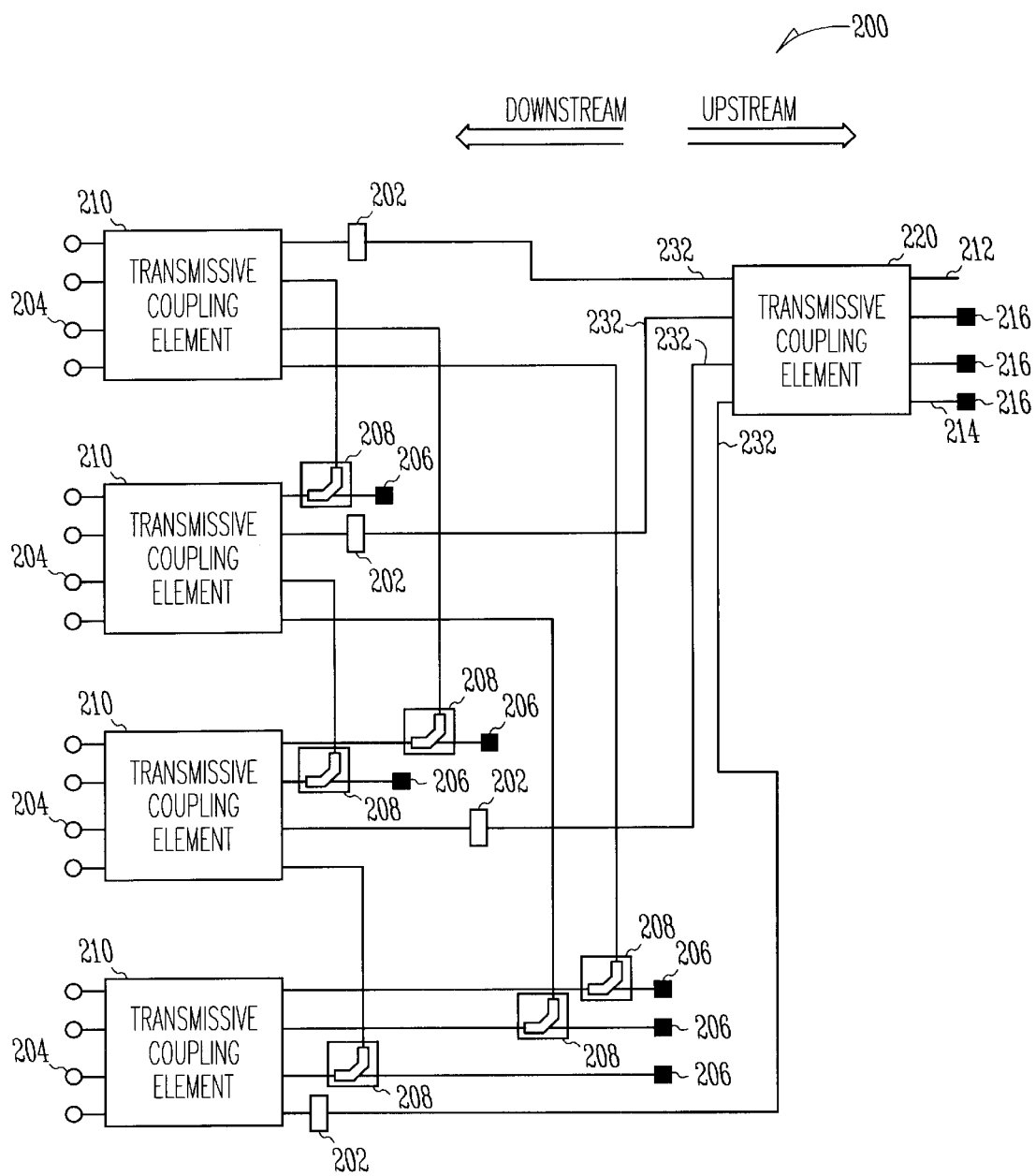
FIG. 2 is a functional block diagram of an optical coupler in accordance with another embodiment of the present invention.

FIG. 2 is a functional block diagram of an optical coupler in accordance with another embodiment of the present invention. Optical coupler 200 operates similarly to optical coupler 100 (FIG. 1) but with more inputs. Upstream signals on wavelengths received at inputs 204 combine in transmissive coupling elements 210 and 220 and transfer to one or more outputs 212, 214. Downstream signals on wavelengths received at one or more outputs 212, 214 divide in transmissive coupling elements 220 and 210 and transfer to inputs 204. For a predetermined wavelength received at inputs 204, wavelength-selective reflective elements 202 reflect the predetermined wavelength back through one of transmissive coupling elements 210. Wavelength-selective coupling elements 208 transfer the predetermined wavelength to other transmissive coupling elements 210. Accordingly, when the predetermined wavelength is received at any of inputs 204, it transfers back to all inputs 204. Terminations 206 may terminate wavelengths to reduce reflections back to wavelength-selective coupling elements 208. Terminations 216 may terminate unused outputs of transmissive coupling element 220. As used in reference to reflective/transmissive coupler 200, the terms "input" and "output" are used for convenience to designate the flow of upstream signals. Transmissive coupling elements 210 and 220 may operate equally for both upstream and downstream directions and therefore the terms "input" and "output" are interchangeable.

Transmissive coupling elements 210 and 220 may be 4×4 transmissive star couplers. Each 4×4 transmissive star coupler may be comprised of several 2×2 transmissive star couplers. Wavelength-selective reflective elements 202 may function similarly to wavelength-selective reflective elements 102 or 104 (FIG. 1). Wavelength-selective coupling elements 208 may function similarly to wavelength-selective coupling element 108 (FIG. 1). Terminations 206 and 216 may function similarly to terminations 142 and 144 (FIG. 1) respectively.

Although optical coupler 200 is illustrated with 4×4 transmissive star couplers, optical coupler 200 may be extended by those skilled in the art to utilize other types of optical couplers including, for example, 16×16 transmissive star couplers. In one embodiment, transmissive coupling elements 210 and 220 may include several 2×2 evanescent couplers such as fused biconic taper devices as basic building blocks to form the transmissive coupling elements. In another embodiment, transmissive coupling elements 210 and 220 may be configured in a hierarchy to combine and divide optical signals.

In an alternative embodiment of optical coupler 200, one or more of inputs 232 of transmissive coupling element 220 may connect with a direct output of one of wavelength-selective coupling elements 208 rather than connecting with wavelength-selective reflective element 202. In this embodiment, one or more terminations 206 may be used to terminate optical signals passing through an wavelength-selective reflective elements 202.

In another alternative embodiment, optical coupler 200 need not include all, and may include only some, of wavelength-selective coupling elements 208. One or more wavelength-selective coupling elements 208 may be replaced with straight-through optical connections. In this embodiment, other upstream wavelengths in addition to the predetermined wavelength received at any of inputs 204 transfer to the other transmissive coupling elements 210. When used in an optical network for combining upstream data transmissions and dividing downstream data transmissions, the upstream data from any particular end node is available to the other end nodes. End nodes may, for example, be restricted to identifying "end of transmission codes" to address privacy concerns.

Figure 3:
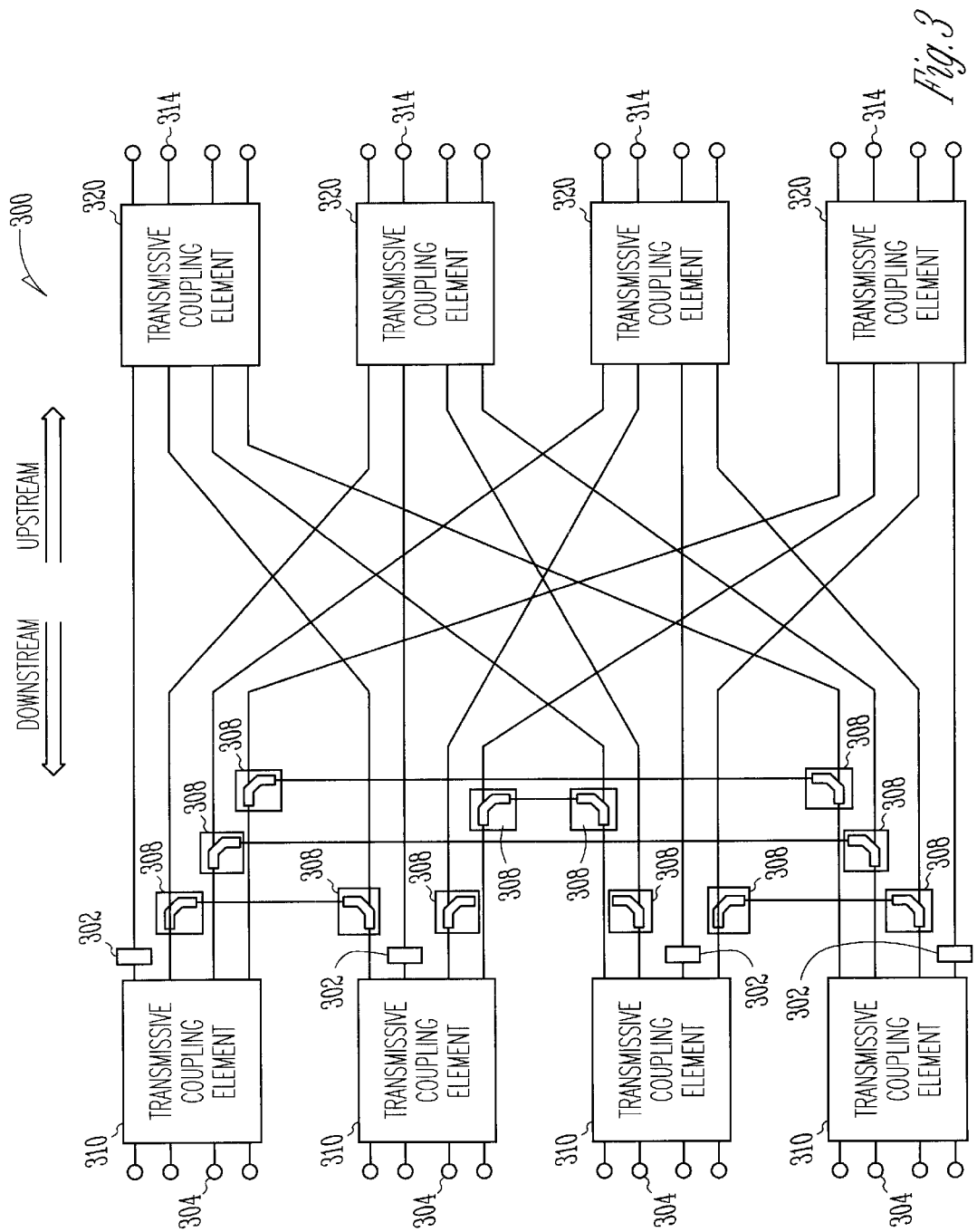
FIG. 3 is a functional block diagram of an optical coupler in accordance with another embodiment of the present invention.

FIG. 3 is a functional block diagram of an optical coupler in accordance with another embodiment of the present invention. Optical coupler 300 operates similarly to a transmissive star coupler for most upstream wavelengths other than one or more predetermined wavelengths. Optical coupler 300 also operates similarly to a transmissive star coupler for downstream wavelengths. Optical coupler 300 operates similarly to a reflective splitter for the predetermined wavelengths received in the upstream direction. Upstream signals on wavelengths received at any of inputs 304 combine in transmissive coupling elements 310 and coupling elements 320 and transfer to each of outputs 314. Downstream signals on wavelengths at any of outputs 314 transfer to each input 304. For particular wavelengths, such as the predetermined wavelength received at inputs 304, wavelength-selective reflective elements 302 reflect the predetermined wavelength back through the associated transmissive coupling element 310. Wavelength-selective coupling elements 308 couple the predetermined wavelength to other coupling elements 310. Accordingly, when any of inputs 304 receive the predetermined wavelength, the predetermined wavelength transfers back to all inputs 304. The direct outputs of wavelength-selective coupling elements 308 connect with inputs of transmissive coupling elements 320 allowing wavelengths other than the predetermined wavelength to transfer between coupling elements 310 and 320.

Figure 4:
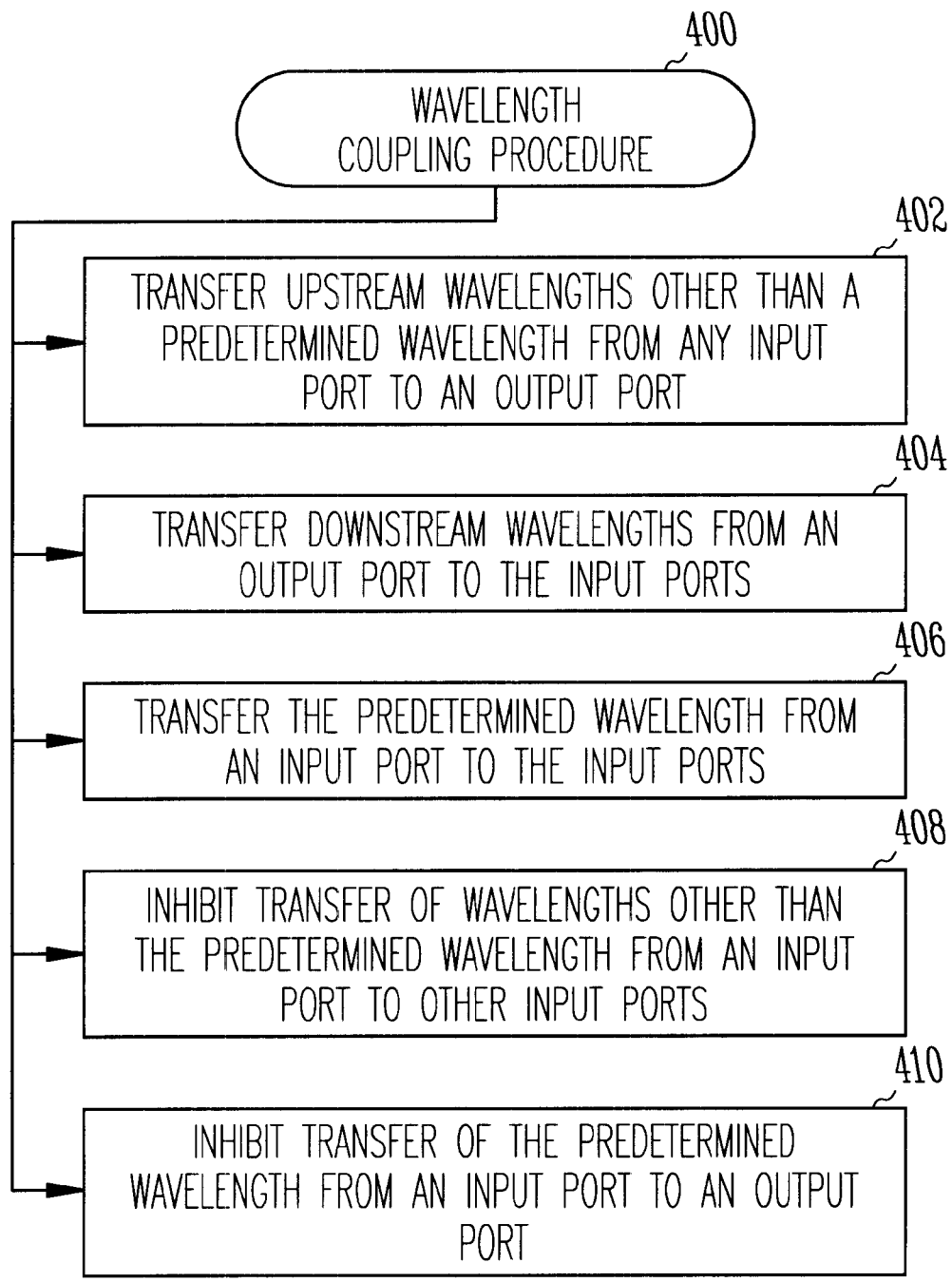
FIG. 4 is a wavelength coupling procedure in accordance with an embodiment of the present invention.

FIG. 4 is a wavelength coupling procedure in accordance with an embodiment of the present invention. Wavelength coupling procedure 400 may be performed, for example, by one or more of the embodiments of the present invention described in FIGS. 1–3. Although the individual operations of procedure 400 are illustrated and described as separate operations, it should be noted that one or more of the individual operations may be performed concurrently. Further, nothing necessarily requires that the operations be performed in the order illustrated. The terms "input" and "output" are used herein for convenience to generally designate the flow of signals in the upstream direction. The terms however, may be interchanged to designate the flow of signals in the downstream direction.

Operation 402 transfers upstream wavelengths other than a predetermined wavelength received at input ports to output ports. Operation 404 transfers downstream wavelengths from an output port to the input ports. Operation 406 transfers upstream signals on the predetermined wavelength from at an input port to each of the input ports. Operation 408 inhibits transferring signals on wavelengths other than the predetermined wavelength received at an input port from transmission to the other input ports. Operation 410 inhibits transferring the predetermined wavelength from an input port to an output port.

A wavelength-selective reflective element may perform operation 406 reflecting the predetermined wavelength from a transmissive coupling element. The wavelength-selective reflective element may also perform operation 402 passing the other wavelengths between coupling elements. At least one wavelength-selective coupling element may perform operation 406 transferring the predetermined wavelength between the transmissive coupling elements and inhibiting transmission of other wavelengths therebetween.

The various embodiments of the optical coupler and methods of the present invention may be used in an optical network that communicates upstream data utilizing a time division multiple access (TDMA) technique. End nodes transmit upstream data on an upstream wavelength in accordance with a transmission sequence. The end nodes transmit a timing signal on the predetermined wavelength to indicate completion of the upstream data transmission. The timing signals are "reflected" by the optical couple of the present invention to each of the end nodes. The end nodes track the timing signals to determine when to transmit upstream data in accordance with the transmission sequence. The optical network includes the optical coupler of the present invention coupled to the system head-end with a distribution fiber. The optical coupler of the present invention connects to the end nodes with drop fibers. The optical coupler of the present invention "reflects" the timing signals on the predetermined wavelength and passes upstream and downstream data on other wavelengths.

An optical coupler and method of coupling optical signals have been described. The optical coupler may improve upstream data transmission efficiency in an optical network. The optical coupler may also reduce or eliminate request/grant negotiation and propagation time for scheduling upstream data transmissions. The optical coupler distinguishes between upstream data and upstream control signals. The optical coupler operates as a reflective splitter for predetermined wavelengths and operates as a transmissive combiner and a transmissive splitter for other wavelengths.

The foregoing description of the specific embodiments reveals the general nature of the invention sufficiently that others can, by applying current knowledge, readily modify and adapt it for various applications without departing from the generic concept, and therefore such adaptations and modifications are intended to be comprehended within the meaning and range of equivalents of the disclosed embodiments. It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. An optical coupler comprising:

first, second and third transmissive coupling elements, the first and second transmissive coupling elements each having input ports to provide input ports for the optical coupler, and the third transmissive coupling element providing at least one output port for the optical coupler;

a wavelength-selective reflective element to reflect a predetermined wavelength from an output of the first transmissive coupling element and pass other wavelengths to the third transmissive coupling element; and a wavelength-selective coupling element to transfer the predetermined wavelength between outputs of the first and second transmissive coupling elements and inhibit transmission of other wavelengths therebetween, wherein the first transmissive coupling element transfers at least the predetermined wavelength, when received at any one of the input ports of the first transmissive coupling element, to both the wavelength-selective reflective element and the wavelength selective coupling element, the predetermined wavelength being reflected by the wavelength-selective reflective element back through the first transmissive coupling element to the input ports of the first transmissive coupling element, the wavelength selective coupling element coupling the predetermined wavelength to the second transmissive coupling element to be provided through the second transmissive coupling element to the input ports of the second transmissive coupling element.

2. The optical coupler of claim 1 wherein the wavelength-selective reflective element is a first wavelength-selective reflective element, and wherein the optical coupler further comprises a second wavelength-selective reflective element to reflect the predetermined wavelength from an output of the second transmissive coupling element and pass other wavelengths to the third transmissive coupling element, wherein the second transmissive coupling element transfers at least the predetermined wavelength, when received at any one of the input ports of the second transmissive coupling element, to both the second wavelength-selective reflective element and the wavelength selective coupling element, the predetermined wavelength being reflected by the second wavelength-selective reflective element back to the input ports of the second transmissive coupling element, the wavelength selective coupling element coupling the predetermined wavelength to the first transmissive coupling element to be provided to the input ports of the transmissive coupling element, the predetermined wavelength being transferred to each input port of the optical coupler when received at any one of the input ports of the optical coupler, wavelengths other than the predetermined wavelength are transferred to the at least one output port of the optical coupler when received at any input port of the optical coupler, and wavelengths other than the predetermined wavelength are transferred to each input port of the optical coupler when received at the at least one output port.

3. The optical coupler of claim 2 further comprising a fourth transmissive coupling element providing additional output ports for the optical coupler, the third and fourth transmissive coupling elements providing an equal number of output ports as the input ports provided by the first and second transmissive coupling elements.

4. The optical coupler of claim 1 wherein the first, second and third transmissive coupling elements function as transmissive star couplers, and wherein the wavelength-selective coupling element has a fiber grating with a resonance wavelength at the predetermined wavelength.

5. The optical coupler of claim 4 wherein the first and second wavelength-selective reflective elements include a Bragg grating with a spacing of one-half the predetermined wavelength to substantially reflect the predetermined wavelength and to pass other wavelengths.

6. The optical coupler of claim 1 further comprising:
a first optical waveguide to transfer wavelengths between the wavelength-selective reflective element and the first transmissive coupling element;
a second optical waveguide to transfer wavelengths other than the predetermined wavelength between the wavelength-selective reflective element and the third transmissive coupling element; and
a third optical waveguide to transfer wavelengths between the wavelength-selective coupling element and the first transmissive coupling element.

7. The optical coupler of claim 1 wherein the first, second and third transmissive coupling elements are transmissive star couplers, and wherein the wavelength-selective coupling element transfers wavelengths other than the predetermined wavelength from the second transmissive coupling element to an optical termination.

8. The optical coupler of claim 1 wherein the first, second and third transmissive coupling elements are transmissive star couplers, and wherein the wavelength-selective coupling element transfers wavelengths other than the predetermined wavelength from the first transmissive coupling element to the second transmissive coupling element.

9. A reflective/transmissive optical coupler comprising:
first, second and third transmissive coupling elements configured to combine wavelengths, the first and second transmissive coupling elements each having input ports to provide input ports for the optical coupler, and the third transmissive coupling element providing at least one output port for the optical coupler;
a first wavelength-selective reflective element to reflect a predetermined wavelength from an output of the first transmissive coupling element to inputs of the first transmissive coupling element;
a second wavelength-selective reflective element to reflect the predetermined wavelength from an output of the second transmissive coupling element to an input of the second transmissive coupling element; and
a wavelength-selective coupling element to transfer the predetermined wavelength between outputs of the first and second transmissive coupling elements and inhibit transmission of other wavelengths between the outputs of the first and second couplers, wherein the first transmissive coupling element transfers at least the predetermined wavelength, when received at any one of the input ports of the first transmissive coupling element, to both the first wavelength-selective reflective element and the wavelength selective coupling element, the predetermined wavelength being reflected by the first wavelength-selective reflective element back through the first transmissive coupling element to the input ports of the first transmissive coupling element, the wavelength selective coupling element coupling the predetermined wavelength to the second transmissive coupling element to be provided through the second transmissive coupling element to the input ports of the second transmissive coupling element, and wherein the second transmissive coupling element transfers at least the predetermined wavelength, when received at any one of the input ports of the second transmissive coupling element, to both the second wavelength-selective reflective element and the wavelength selective coupling element, the predetermined wavelength being reflected by the second wavelength-selective reflective element back to the input ports of the second transmissive coupling element, the wavelength selective coupling element coupling the predetermined wavelength to the first transmissive coupling element to be provided to the input ports of the transmissive coupling element.

10. The reflective/transmissive optical coupler of claim 9 wherein the wavelength-selective coupling element transfers the predetermined wavelength from a second output of the second transmissive coupling element to a second output of the first transmissive coupling element, the first transmissive coupling element transferring the predetermined wavelength to the inputs of the first transmissive coupling element when received at the second output.

11. The reflective/transmissive optical coupler of claim 10 wherein the wavelength-selective coupling element has an input to receive wavelengths from the second transmissive coupling element, a direct output to transfer the other wavelengths and a coupled output to transfer the predetermined wavelength other than the other wavelengths to the first transmissive coupling element.

12. The reflective/transmissive optical coupler of claim 10 wherein the wavelength-selective coupling element further transfers the predetermined wavelength from the second output of the first transmissive coupling element to the second output of the second transmissive coupling element, the second transmissive coupling element transferring the predetermined wavelength to the input ports of the second transmissive coupling element when received at the second output.

13. The reflective/transmissive optical coupler of claim 9 wherein the first, second and third transmissive coupling elements combine wavelengths received from the input ports of the first and second transmissive coupling elements and transfer a combined output signal other than the predetermined wavelength to the at least one output of the third transmissive coupling element, and wherein the first, second and third transmissive coupling elements divide energy of wavelengths received at the at least one output of the third transmissive coupling element among the input ports of the first and second transmissive coupling elements.

14. The reflective/transmissive optical coupler of claim 9 wherein the wavelength-selective coupling element has at least one fiber grating with a resonance wavelength at the predetermined wavelength.

15. The reflective/transmissive optical coupler of claim 9 wherein at least one of the first and second wavelength-selective reflective elements has a Bragg grating with a spacing of one-half the predetermined wavelength to substantially reflect the predetermined wavelength and to pass substantially the other wavelengths.

16. The reflective/transmissive optical coupler of claim 9 further comprising:
a first optical waveguide to transfer wavelengths between the first wavelength-selective reflective element and the first transmissive coupling element;
a second optical waveguide to transfer wavelengths other than the predetermined wavelength between the first wavelength-selective reflective element and the third transmissive coupling element; and
a third optical waveguide to transfer wavelengths between the wavelength-selective coupling element and the first transmissive coupling element.

17. The reflective/transmissive optical coupler of claim 9 wherein the first, second and third transmissive coupling elements are transmissive star couplers, the first and second transmissive coupling elements having the at least two input ports and at least two outputs, the third transmissive coupling element having at least two inputs and the at least one output port, the reflective/transmissive optical coupler having at least four input ports corresponding with the input ports of the first and second transmissive coupling elements and having at least one output port corresponding with the at least one output port of the third transmissive coupling element.

18. A reflective/transmissive optical coupler comprising:
first, second and third transmissive coupling elements configured to combine wavelengths;
a first wavelength-selective reflective element to reflect a predetermined wavelength from an output of the first transmissive coupling element to inputs of the first transmissive coupling element;
a second wavelength-selective reflective element to reflect the predetermined wavelength from an output of the second transmissive coupling element to an input of the second transmissive coupling element; and
a wavelength-selective coupling element to transfer the predetermined wavelength between outputs of the first and second transmissive coupling elements and inhibit transmission of other wavelengths between the outputs of the first and second couplers,
wherein the wavelength-selective coupling element transfers the predetermined wavelength from a second output of the second transmissive coupling element to a second output of the first transmissive coupling element, the first transmissive coupling element transferring the predetermined wavelength to the inputs of the first transmissive coupling element when received at the second output, and
wherein the wavelength-selective coupling element has an input to receive wavelengths from the second transmissive coupling element, a direct output to transfer the other wavelengths and a coupled output to transfer the predetermined wavelength other than the other wavelengths to the first transmissive coupling element,
and wherein the reflective/transmissive optical coupler further comprises a termination to reduce reflections of the other wavelengths from being reflected back to the direct output of the wavelength-selective coupling element.

19. A reflective/transmissive optical coupler comprising:
first, second and third transmissive coupling elements configured to combine wavelengths;
a first wavelength-selective reflective element to reflect a predetermined wavelength from an output of the first transmissive coupling element to inputs of the first transmissive coupling element;
a second wavelength-selective reflective element to reflect the predetermined wavelength from an output of the second transmissive coupling element to an input of the second transmissive coupling element; and
a wavelength-selective coupling element to transfer the predetermined wavelength between outputs of the first and second transmissive coupling elements and inhibit transmission of other wavelengths between the outputs of the first and second couplers, and
wherein at least one of the first and second wavelength reflective elements is a lens having a coating to substantially reflect the predetermined wavelength and to pass substantially the other wavelengths.

20. A reflective/transmissive optical coupler comprising:
first, second and third transmissive coupling elements configured to combine wavelengths;
a first wavelength-selective reflective element to reflect a predetermined wavelength from an output of the first transmissive coupling element to inputs of the first transmissive coupling element;
a second wavelength-selective reflective element to reflect the predetermined wavelength from an output of the second transmissive coupling element to an input of the second transmissive coupling element;
a wavelength-selective coupling element to transfer the predetermined wavelength between outputs of the first and second transmissive coupling elements and inhibit transmission of other wavelengths between the outputs of the first and second couplers;
fourth and fifth transmissive coupling elements;
a third wavelength-selective reflective element to reflect the predetermined wavelength from an output of the fourth transmissive coupling element back through the fourth transmissive coupling element to inputs of the fourth transmissive coupling element, and to transfer the other wavelengths from the first output of the fourth transmissive coupling element to an input of the third transmissive coupling element;
a fourth wavelength-selective reflective element to reflect the predetermined wavelength from an output of the fifth transmissive coupling element back through the fifth transmissive coupling element to inputs of the fifth transmissive coupling element, and to transfer the other wavelengths from the first output of the fifth transmissive coupling element to an input of the third transmissive coupling element; and
additional wavelength-selective coupling elements to transfer the predetermined wavelengths between outputs of the transmissive coupling elements and to inhibit transmission of the other wavelengths therebetween.

21. A method of coupling optical signals comprising:
transferring signals on wavelengths other than a predetermined wavelength received at any of ports of a first set to a port of a second set, wherein the first set of port includes at least four ports;

transferring signals on the predetermined wavelength received at any port of the first set to each other port of the first set; and inhibiting signals on wavelengths other than the predetermined wavelength received at any port of the first set from transmission to the other ports of the first set.

22. The method of claim 21 further comprising transferring signals on wavelengths received at ports of the second set to ports of the first set.

23. The method of claim 22 further comprising:

coupling the predetermined wavelength between a first and second transmissive coupling elements and inhibiting transmission of other wavelengths therebetween with a wavelength-selective coupling element; and reflecting the predetermined wavelength from the first transmissive coupling element and passing other wavelengths to a third transmissive coupling element with a wavelength-selective reflective element.

24. The method of claim 23 wherein the wagelength-selective coupling element has fiber grating with a resonance wavelength at the predetermined wavelength.

25. The method of claim 24 wherein the wavelength-selective reflective element has a Bragg grating with a spacing of one-half the predetermined wavelength to substantially reflect the predetermined wavelength and pass the other wavelengths.

* * * * *

UNITED STATES PATENT AND TRADEMARK OFFICE
CERTIFICATE OF CORRECTION

PATENT NO. : 6,556,745 B1
DATED : April 29, 2003
INVENTOR(S) : David M. Horne

It is certified that error appears in the above-identified patent and that said Letters Patent is hereby corrected as shown below:

Column 14,
Line 5, delete "wagelength-selective" and insert -- wavelength-selective -- therefor.
Line 6, insert -- a -- after "has".

Signed and Sealed this

Seventh Day of September, 2004

JON W. DUDAS
*Acting Director of the United States Patent and Trademark Office*